ized in the art. Examples of such oil-soluble polymerization catalyst include, for example, diacyl peroxides such as lauroyl peroxide and 3,5,5-trimethylhexanoyl peroxide, peroxy esters such as t-butyl peroxypivalate and α-cumyl peroxyneodecanoate, peroxy dicarbonates such as diisopropyl peroxydicarbonate and di-2-ethylhexyl peroxydicarbonate, and azo compounds such as azobisisobutyronitrile and azobis-2,4-dimethylvaleronitrile.

United States Patent [19]
Takeuchi

[11] Patent Number: 5,093,440

[45] Date of Patent: Mar. 3, 1992

[54] METHOD FOR PRODUCING A VINYL CHLORIDE RESIN

[75] Inventor: Katsunori Takeuchi, Yokkaichi, Japan

[73] Assignee: Mitsubishi Kasei Vinyl Company, Tokyo, Japan

[21] Appl. No.: 486,747

[22] Filed: Mar. 1, 1990

[51] Int. Cl.$^5$ .................. C08F 2/20; C08F 114/06; C08K 5/05; C08K 5/41

[52] U.S. Cl. ................. 526/88; 526/344.2; 524/745; 524/748; 524/767

[58] Field of Search ............... 526/88, 344.2; 524/745, 524/748, 767

[56] References Cited

U.S. PATENT DOCUMENTS 3,862,076  1/1975  Dawson et al. .................. 524/748

FOREIGN PATENT DOCUMENTS 50-128788  10/1975  Japan .
51-62889   5/1976   Japan .

Primary Examiner—Joseph L. Schofer
Assistant Examiner—Tom Weber
Attorney, Agent, or Firm—Oblon, Spivak, McClelland, Maier & Neustadt

[57] ABSTRACT

A method for producing a vinyl chloride resin, which comprises suspension-polymerizing vinyl chloride, or a mixture of vinyl chloride with a co-monomer copolymerizable therewith, in an aqueous medium in the presence of an oil-soluble polymerization catalyst, a dispersant and an emulsifier by means of a homogenizer under an emulsifying pressure within a range of from 5 to 50 kg/cm$^2$ in such a state that the organic phase is dispersed in the aqueous phase.

8 Claims, No Drawings

METHOD FOR PRODUCING A VINYL CHLORIDE RESIN

The present invention relates to a method for producing a vinyl chloride resin. More particularly, it relates to a method for producing a vinyl chloride resin for paste technique having a low viscosity and excellent coating properties.

Paste techniques employing paste sols such as plastisols or organosols, including casting, dip forming and rotational molding, are used in a field of application of vinyl chloride resins. Among them, in a case where high speed processing is required, it is strongly desired to lower the viscosity of the paste sol as far as possible.

As compared with a vinyl chloride resin for general purpose, the vinyl chloride resin for paste technique (i.e. the paste resin) has an average particle size as small as about 0.8 $\mu$m and a particle size distribution as narrow as from 0.2 to 2 $\mu$m. Heretofore, as a method for reducing the viscosity of the paste sol, it has been proposed to substitute a part of the paste resin in the sol by a resin having a large particle size at a level of from 10 to 70 $\mu$m. The resin having a large particle size to be used, is required to have little voids in the particles and have a particle shape which is substantially spherical. If voids in the particles are substantial, or the particle shape is not substantially spherical, the reduction of the viscosity tends to be poor, and it becomes disadvantages to prepare a thin film by a coating method, since the resin contains a substantial amount of particles of e.g. 50 $\mu$m or larger.

It is an object of the present invention to produce a paste resin capable of providing a paste sol having a low viscosity and excellent coating properties industrially advantageously.

The present inventors have conducted extensive studies to overcome the above drawbacks of the conventional techniques and to obtain a paste sol having a low viscosity and excellent coating properties. As a result, it has been found possible to obtain a vinyl chloride resin having a particle size distribution of from 0.1 to 20 $\mu$m by conducting suspension-polymerization under a certain specific condition and thereby obtain a paste sol having a low viscosity, whereby the above object can be attained. The present invention has been accomplished on the basis of this discovery.

The present invention provides a method for producing a vinyl chloride resin, which comprises suspension-polymerizing vinyl chloride, or a mixture of vinyl chloride with a co-monomer copolymerizable therewith, in an aqueous medium in the presence of an oil-soluble polymerization catalyst, a dispersant and an emulsifier by means of a homogenizer under an emulsifying pressure within a range of from 5 to 50 kg/cm$^2$ in such a state that the organic phase is dispersed in the aqueous phase.

Now, the present invention will be described in detail with reference to the preferred embodiments.

The monomer to be used for the method of the present invention includes, in addition to vinyl chloride, a mixture comprising vinyl chloride as the main component and a vinyl co-monomer copolymerizable therewith. Such a vinyl monomer includes, for example, an oil-soluble monomer such as vinyl acetate, styrene, acrylonitrile, an acrylic acid ester, a methacrylic acid ester or ethylene; a water-soluble monomer such as acrylic acid, methacrylic acid, maleic acid or crotonic acid; and an inorganic salt of a vinyl monomer such as sodium acrylate, sodium fumarate or calcium acrylate. Further, it may be a vinyl monomer having a polyfunctional group copolymerizable with vinyl chloride, such as divinylbenzene, diallyl phthalate or diallyl maleate. When such as vinyl monomer having a polyfunctional group is used, a vinyl chloride resin having a cross-linked structure, is obtainable.

As the polymerization catalyst in the method of the present invention, a well known oil-soluble polymerization initiator capable of generating free radicals, such as benzoyl peroxide, lauroyl peroxide or di-tert-butyl peroxide, is used usually in an amount of from 0.01 to 0.1 part by weight per 100 parts by weight of the vinyl chloride monomer (from 0.01 to 0.1 PHM).

As the dispersant, various polyvinyl alcohols obtainable by partially saponifying polyvinyl acetate, various water-soluble cellulose derivatives or suspension stabilizers such as gelatin, which are commonly employed, may be used in an amount within a range of from 0.02 to 2 PHM.

As the emulsifier, a well known alkyl sulfate salt and an alkylaryl sulfonate salt such as sodium lauryl sulfate and sodium dodecylbenzene sulfonate, may be used in an amount within a range of from 0.02 to 2 PHM.

The method of the present invention is conducted by suspension-polymerizing the above monomer, the oil-soluble polymerization catalyst, the dispersant and the emulsifier, in an aqueous medium under an emulsifying pressure of from 5 to 50 kg/cm$^2$ by means of a homogenizer in such a state that the organic phase is dispersed in the aqueous phase.

The homogenizer is an apparatus for preparing a stabilized suspension by uniformly dispersing usually to a liquid other substances immissible therewith, which is so designed that the mixture to be treated, is forcibly passed under pressure through a narrow space formed precisely by a rigid body, followed by releasing the pressure, whereby the mixture is formed into fine particles and uniformly dispersed by the liquid friction, the abrupt reduction in the pressure, the shearing and the collision due to the vigorous turbulent flow thereby created.

In the method of the present invention, it is necessary to operate the homogenizer under a relatively low pressure at a level of from 5 to 50 kg/cm$^2$G. It is particularly preferred to operate it under a pressure of from 10 to 20 kg/cm$^2$G. For example, when the dispersion is conducted under a pressure of 15 kg/cm$^2$G, it is possible to obtain a paste resin having a final particle size distribution of from 0.1 to 20 $\mu$m.

The dispersion thus obtained is reacted at a temperature of from 1° to 90° C., preferably from 30° to 70° C., in accordance with a usual suspension-polymerization method, whereby it is possible to obtain a vinyl chloride resin having a particle size distribution of from 0.1 to 20 $\mu$m, as shown by the Examples given hereinafter. As a result, it is possible to obtain a paste sol having a low viscosity and excellent coating properties.

Now, the present invention will be described in further detail with reference to Examples and Comparative Examples. However, it should be understood that the present invention is by no means restricted to such specific Examples. In the following Examples and Comparative Examples, the particle size and the viscosity of the polyvinyl chloride resin were measured in accordance with the following methods.

Particle size: Measured by a particle counter.

Viscosity: A sol was prepared by mixing 100 parts by weight of a resin and 60 parts by weight of dioctyl phthalate at a temperature of 23° C. under a humidity of 50%, and the viscosity was measured by means of a Brookfield viscometer with No. 6 spindle rotated at 50 rpm.

EXAMPLE 1

Into an autoclave equipped with a stirrer and having an internal capacity of 300 l, 120 kg of water, 1.5 kg of a 4% polyvinyl alcohol aqueous solution (saponification value: 80), 9 kg of a 4% sodium lauryl sulfate aqueous solution and 600 g of lauroyl peroxide, were charged. After flushing with nitrogen gas, 60 kg of vinyl chloride was added under stirring at a rotational speed of 100 rpm.

The dispersion thus obtained was supplied to a homogenizer (15M-8TA, manufactured by MANTON-GAULIN CO.) under an emulsifying pressure of 10 kg/cm$^2$ for homogenizing treatment. Then, the mixture was supplied to another autoclave equipped with a stirrer and having an internal capacity of 300 l, and the suspension-polymerization was conducted while stirring the mixture at a rotational speed of 100 rpm at 57° C. The reaction was continued until the pressure started to drop. After completion of the polymerization reaction, unreacted vinyl chloride monomer was removed, and the residue was dehydrated and dried to obtain a polyvinyl chloride resin.

The particle size of the polyvinyl chloride resin thus obtained and the viscosity of the paste sol were measured. The results are shown in Table 1.

EXAMPLE 2

Into the same autoclave as used in Example 1, 120 kg of water, 3 kg of a 4% polyvinyl alcohol aqueous solution (saponification value: 80), 3 kg of a 4% sodium lauryl sulfate aqueous solution and 600 g of lauroyl peroxide were charged. After flushing with nitrogen gas, 60 kg of vinyl chloride was added under stirring at a rotational speed of 100 rpm.

The dispersion thus obtained was supplied to the same homogenizer as used in Example 1 under an emulsifying pressure of 20 kg/cm$^2$ for homogenizing treatment. Then, the suspension-polymerization was conducted in the same manner as in Example 1. The particle size of the polyvinyl chloride resin thus obtained and the viscosity of the paste sol were measured. The results are shown in Table 1.

EXAMPLE 3

Into the same autoclave as used in Example 1, 120 kg of water, 750 g of a 4% polyvinyl alcohol aqueous solution (saponification value: 80), 6 kg of a 4% sodium dodecylbenzene sulfonate aqueous solution and 600 g of lauroyl peroxide were charged. After flushing with nitrogen gas, 60 kg of vinyl chloride was added under stirring at a rotational speed of 100 rpm.

The dispersion thus obtained was supplied to the same homogenizer as used in Example 1 under a pressure of 10 kg/cm$^2$ for homogenizing treatment. Then, the suspension-polymerization was conducted in the same manner as in Example 1. The particle size of the polyvinyl chloride resin thus obtained and the viscosity of the paste sol were measured. The results are shown in Table 1.

EXAMPLE 4

A dispersion obtained in the same manner as in Example 2 except that instead of 3 kg of the 4% polyvinyl alcohol aqueous solution having a saponification value of 80 used in Example 2, 3 kg of a 4% polyvinyl alcohol aqueous solution having a saponification value of 70, was used, was subjected to homogenizing treatment in the same manner as in Example 2, followed by suspension-polymerization. The particle size of the polyvinyl chloride resin thus obtained and the viscosity of the paste sol were measured. The results are as shown in Table 1.

EXAMPLE 5

The treatment was conducted in the same manner as in Example 1 except that instead of the homogenizer manufactured by MANTON-GAULIN CO. used in Example 1, an Inline Homomixer (0/100 Model, manufactured by EUROTEC, LTD.) was used, and the treatment was conducted under an emulsifying pressure of 10 kg/cm$^2$G.

The particle size of the polyvinyl chloride resin thus obtained and the viscosity of the paste sol were measured. The results are shown in Table 1.

EXAMPLE 6

The treatment was conducted in the same manner as in Example 3 except that instead of the homogenizer manufactured by MANTON-GAULIN CO. used in Example 3, the same Inline Homomixer as used in Example 5 was used, and the treatment was conducted under an emulsifying pressure of 20 kg/cm$^2$G.

The particle size of the polyvinyl chloride resin thus obtained and the viscosity of the paste sol were measured. The results are shown in Table 1.

COMPARATIVE EXAMPLES 1 to 5

The treatments were conducted in the same manner as in Examples 1 to 5, respectively, except that the pressure for homogenizing treatment in Examples 1 to 5 was changed to 150 kg/cm$^2$G (Comparative Examples 1 to 4) or to 100 kg/cm$^2$G (Comparative Example 5).

The particle sizes of the polyvinyl chloride resins thus obtained and the viscosities of the paste sol were measured. The results are shown in Table 1. In each case, the particle size was fine, the particle size distribution was sharp, and the viscosity was very high.

TABLE 1

| | Emulsifier | | Dispersant | | Homogenizing pressure (kg/cm$^2$G) | Particle size (μm) | | | Viscosity (cps) |
|---|---|---|---|---|---|---|---|---|---|
| | Type | Amount (PHM) | Saponification value | Amount (PHM) | | Minimum | Maximum | Average | |
| Example 1 | SLS | 0.6 | 80 | 0.1 | 10 | 0.5 | 15 | 1.7 | 4300 |
| Example 2 | SLS | 0.2 | 80 | 0.2 | 20 | 0.4 | 14 | 1.5 | 3900 |
| Example 3 | DBS | 0.6 | 80 | 0.1 | 10 | 0.5 | 14 | 1.7 | 4200 |
| Example 4 | SLS | 0.2 | 70 | 0.2 | 20 | 0.4 | 15 | 1.5 | 4000 |
| Example 5 | SLS | 0.6 | 80 | 0.1 | 10 | 0.5 | 15 | 1.5 | 4100 |

TABLE 1-continued

|  | Emulsifier | | Dispersant | | Homogenizing pressure (kg/cm²G) | Particle size (μm) | | | Viscosity (cps) |
|  | Type | Amount (PHM) | Saponification value | Amount (PHM) | | Minimum | Maximum | Average | |
| --- | --- | --- | --- | --- | --- | --- | --- | --- | --- |
| Example 6 | DBS | 0.6 | 80 | 0.1 | 20 | 0.4 | 13 | 1.3 | 4300 |
| Comparative Example | SLS | 0.6 | 80 | 0.1 | 150 | 0.4 | 1.5 | 0.7 | 12000 |
| Comparative Example 2 | SLS | 0.2 | 80 | 0.2 | 150 | 0.4 | 1.3 | 0.7 | 11000 |
| Comparative Example 3 | DBS | 0.6 | 80 | 0.1 | 150 | 0.4 | 1.3 | 0.7 | 12500 |
| Comparative Example 4 | SLS | 0.2 | 70 | 0.2 | 150 | 0.4 | 1.2 | 0.7 | 13000 |
| Comparative Example 5 | SLS | 0.6 | 80 | 0.1 | 100 | 0.4 | 1.6 | 0.7 | 12000 |

PHM: Amount (parts by weight) per 100 parts by weight of the vinyl chloride monomer.
SLS: 4% sodium lauryl sulfonate aqueous solution.
DBS: 4% sodium dodecylbenzene sulfonate aqueous solution.

As shown in Table, according to the method of the present invention, it is possible to obtain a vinyl chloride resin having a certain specific particle size distribution (0.1-20 μm) and a low viscosity. As a result, it is possible to obtain a paste sol having excellent coating properties, which is useful in the field of casting, dip forming or rotational molding where a high speed processing is required.

I claim:

1. A method for producing a vinyl chloride resin, which comprises suspension-polymerizing vinyl chloride, or a mixture of vinyl chloride with a co-monomer copolymerization therewith, in an aqueous medium in the presence of an oil-soluble polymerization catalyst, a dispersant and an emulsifier by means of a homogenizer under an emulsifying pressure within a range of from 5 to 50 kg/cm² in such a state that the organic phase is dispersed in the aqueous phase.

2. The method according to claim 1, wherein the comonomer copolymerizable with vinyl chloride is vinyl acetate, styrene, acrylonitrile, an acrylic acid ester, a methacrylic acid ester, ethylene, acrylic acid, methacrylic acid, maleic acid, crotonic acid, sodium acrylate, sodium fumarate, calcium acrylate, divinylbenzene, diallyl phthalate or diallyl maleate.

3. The method according to claim 1, wherein the polymerization catalyst is benzoyl peroxide, lauroyl peroxide or di-tert-butyl peroxide used in an amount of from 0.01 to 0.1 part by weight per 100 parts by weight of the vinyl chloride monomer.

4. The method according to claim 1, wherein the dispersant is a polyvinyl alcohol obtained by partial saponification of polyvinyl acetate, a water-soluble cellulose derivative or a suspension stabilizer such as gelatin used within a range of from 0.02 to 2 PHM.

5. The method according to claim 1, wherein the emulsifier is an alkyl sulfate salt or an alkylaryl sulfonate salt used in an amount of from 0.02 to 2 PHM.

6. The method according to claim 1, wherein the emulsifying pressure is within a range of from 10 to 20 kg/cm².

7. The method according to claim 1, wherein the suspension-polymerization is conducted at a temperature of from 1° to 90° C.

8. The method according to claim 1, wherein the vinyl chloride resin has a particle size distribution of from 0.1 to 20 μm.

* * * * *